United States Patent Office 3,396,837
Patented Aug. 13, 1968

3,396,837
PRESSURE-SENSITIVE ADHESIVE MASKING TAPE HAVING POLYPROPYLENE FILM BACKING
Ambrose F. Schmelzle, White Bear Lake, and Charlotte I. Sauer, North St. Paul, Minn., assignors to Minnesota Mining and Manufacturing Company, St. Paul, Minn., a corporation of Delaware
No Drawing. Filed Mar. 16, 1964, Ser. No. 352,369
3 Claims. (Cl. 206—59)

This invention relates to a novel type of stretchable finger-tearable pressure-sensitive adhesive masking tape. In contrast to conventional masking tapes which have a creped paper backing, the present masking tape is nonfibrous and has a nonporous flat pigmented polypropylene film backing.

Surprisingly, it has been discovered that the use of a particular kind of pigmented polypropylene film, which is melt-formed, unplasticized and unoriented, coated with pressure-sensitive adhesive, permits of a tape product possessing all of the essential features required in a first class masking tape of general utility.

Pressure-sensitive adhesive masking tapes, supplied in roll form, have been commercially used on a large scale for many years. They are widely used in connection with painting operations to mask various surface areas from the applied paint, lacquer, varnish or enamel, and following drying or curing, often involving a baking operation, the tape is stripped off. A stretchable finger-tearable tape having suitable resistance to heat and solvents is required.

The conventional masking tape backing is a porous creped paper, similar to absorbent towelling paper, that is impregnated and unified by a flexible and stretchable composition (such as a rubber-resin blend or an elastomer) which binds the fibers together and provides a barrier to penetration by lacquer solvents and the like. The back surface is commonly given a thin backsize coating or coatings adapted to reduce the force needed for unwinding tape from the roll and to provide a continuous sealing of the pores which increases the barrier action and also makes for a smoother surface. The front or face side of the backing is commonly given a primer coating to improve the bonding of the adhesive, and is coated with an aggressively tacky viscoelastic pressure-sensitive adhesive. This adhesive is aggressively tacky in its normal dry state at normal temperatures, such that when the tape is applied it will adhere upon contact with no more than finger rubbing or pressing being needed to secure firm adhesion to the contacted surface.

This prior creped-paper tape commonly has a stretch value in the range of about 5 to 15% (by which is meant the percent elongation when the tape is slowly pulled by hand or machine until it ruptures), and it has a "deadstretch" characteristic (as distinguished from a retractable "live-stretch" such as that of rubber bands), which in combination permit the tape, when necessary, to be stably conformed to curved or irregular surfaces and to provide a curved marginal edge, without the tape subsequently retracting or drawing away.

Among the advantages of the present nonfibrous film type of masking tape are: The tape has a smooth soft back surface which avoids the roughness and the consequent finger irritation to which workmen who daily use creped paper tape are subjected. The tape has an exceptionally soft and pliant feel when unwound from the roll and applied. The applied tape is thinner and flatter and has nonfibrous edges, which permit of a sharper demarcation between painted and masked surface areas.

A very striking improvement over conventional masking tapes results from the fact the present film has a stretch value (elongation before break) of over 100%, whereas typical creped-paper masking tape backings have had values in the range of 5 to 15%. These comparisons are based on elongation measurements of sample strips one inch wide, elongated at the rate of 500% per minute between the jaws on an Instron tensile tester. (This provides a more accurate comparison at low stretching rates than is possible with actual hand-pulling.) The greater resultant stretch of the present masking tape makes it possible to obtain good curved masking edges even when severe curves (of small radius) are desired, and the tape lies flat around the curve, without buckling or peaking, so as to define a clean sharp edge.

The present masking tape has a "dead-stretch" value of at least 50%. It has a stress-strain characteristic permitting unwinding from the roll without distortion, and yet permitting easy conformation to curved surfaces and the obtaining of good curved masking edges even when severe curves are required. The tape can also be readily applied to provide a long straight masking edge when desired.

Although the present backing film is nonporous and impervious to lacquer solvents and the like, it can be given an adhesion-promoting treatment to provide a back surface to which fluid coating compositions will cling. There need be no run off to cause streaking or unevenness of the coating which is on the base surface adjacent the tape. This property is also of importance when certain paint primers are sprayed on to avoid flaking off of the dried coating during subsequent spray painting.

These desirable features are obtained in a tape which is readily finger-tearable so that, as with paper masking tape, a workman needs no tools to separate a piece of tape from the roll.

The theoretical desirability of a nonfibrous pressure-sensitive adhesive masking tape having a nonporous film backing has been obvious for many years. However, so far as we are aware, no one has heretofore solved the problem to provide a tape which is commercially suitable and acceptable as a general replacement for the aforesaid creped-paper backed masking tapes. It is believed that the present invention has provided for the first time a film-backed masking tape capable of winning such acceptance and which has features that make it superior in some respects.

It will be evident from the foregoing discussion that a "paper-like" nonfibrous backing film material capable of successful use for the present purpose must simultaneously possess a substantial number of different properties in balance relation.

Films which are sufficiently strong and stretchable and have adequate solvent and heat resistance properties, would normally be too tough and tear-resistant for general masking tape backing usage. The polypropylene films heretofore on the market are too tough and tear-resistant for the present purpose. The principal commercial usage of such films has been in packaging applications where transparency, optical clarity, ductility and toughnesses are important.

However, we have discovered that crystalline isotactic propylene polymers can be compounded and processed by a melt-forming procedure to provide finished films which do possess the requisite combination of balanced properties.

Suitable uncompounded isotactic polypropylene resins as obtained from one supplier have a nominal density of 0.905 and a melting point value of approximately 170° C. but similar and equivalent isotactic polypropylene resins can be employed. The "melt flow" ("melt index") value should be in the range of 1 to 10 (preferably 4 to 8). The melt flow value can be determined by ASTM Test Method D1238 ($I_2$ at 230° C.). The higher melt flow values correspond to lower polymer molecular weights and vice versa. Mixtures of polymers of low and higher values can be used to obtain an intermediate average and broadened range. The pigment component is thoroughly blended with the propylene resin to obtain a good dispersion. The use of master batch procedures is preferred for ease and efficiency of compounding. In making films by the extrusion melt-forming method, a viscous melt of the compounded pigmented polypropylene resin is downwardly extruded as a flat film sheeting which drops into the nip of a pair of rolls, with suitable quenching or cooling being employed, to provide a smooth opaque film having a thickness of approximately 3–4 mils, which can then be wound up in a jumbo roll. A combination of a chromium plated steel roll and a steel roll covered by a silicone rubber sleeve to provide traction is preferred.

The rate of cooling is adjusted (as by circulation of a coolant in one or both of the nip rolls to regulate the roll temperature) to provide a film product which, in strip form as an adhesive tape backing, will adequately elongate or stretch when hand pulled at a slow rate such as is employed in conforming a masking tape to a curved boundary, and yet can be readily torn by using the fingers to pull the film apart in a forceful rapid manner. Cooling too rapidly causes excessive ductility and tear-resistance; while cooling too slowly causes increased crystallinity, excessive rigidity, and inadequate stretchiness and strength.

While the above extrusion procedure is preferred, properly controlled calendering melt-forming procedures can be used in film manufacture.

The pigment particles dispersed in the film not only serve to produce coloration and opacity, but also modify the tensile properties, so as to result in the so-called "paper-like" characteristic. This pigment loading can be used to render the film product less tough and more readily tearable. Titanium dioxide pigment is preferred and, if used alone, results in a white-colored film. The term "pigment" is here used to include finely divided solid filler materials (such as amorphous colloidal silica) even though not classed as coloration or opacifying pigments. Chromatic colorants can be included in obtaining a desired appearance, as by including brown iron oxide and yellow strontium chromate pigments with titanium dioxide pigment in manufacturing a tape having a light tan or brown colored backing resembling the color of kraft paper. The film does not have to be rendered completely opaque, a paper-like semitranslucency characteristic being appropriate and desirable in manufacturing film-backed adhesive tapes acceptable as replacements for paper-backed adhesive tapes. These objectives are obtained with total pigment concentrations in the film which are in the range of about 2 to 20% (depending upon the particular pigments and the particular desired results), subject of course to making selections which result in meeting the requirements as to the tensile characteristics of the films of this invention which are specified hereinafter.

Other types of modifying agents or additives can be employed in minor proportion. Thus other compatible polymers, such as butyl rubber, can be included in small proportion to modify physical properties of the film, as by increasing toughness to offset a higher than normal pigment loading. Chlorosulfonated polyethylene (an elastomer), on the other hand, can be used to lower the impact strength of the film and reduce the tear resistance. Antioxidants and ultraviolet-light absorbers can be incorporated. Lubricants can be incorporated in the mix to make processing easier when calendering procedures are employed, but are not needed when the preferred extrusion technique is used.

The film is of the "unplasticized" type in that it is substantially or entirely free from liquid plasticizers, the nonrigid or stretch properties being obtained by other means as noted above.

This film product is "unoriented" in the sense that the film has not been subjected to the substantial lengthwise or crosswise stretching (tensilization), or both, such as is sometimes employed in film manufacture to increase toughness. However, a small or incidental degree of polymer orientation is not precluded, such as results when the film is formed by calendering.

It has been empirically ascertained upon the basis of many experiments that for present purposes the aforesaid pigmented polypropylene film product should be compounded and processed in such manner as to have: (A) an elongation at break of over 100% and a tensile strength of at least 10 pounds per inch width when tested at a 500% per minute rate of strain; and (B) an elongation at break in the range of 10 to 50% when tested at a 5000% per minute rate of strain. These films in tape form combine suitable stretch and tensile properties (at slow pull rates) with low impact strength and easy tearability, but without being so brittle as to cause objectionable slivering when masking tape is stripped off after use. This criterion can be used in manufacturing operations in selecting suitable operating conditions, and in providing a quantitative physical specification for the film component of the adhesive tape. These tensile tests are performed at normal room temperature using an Instron tensile tester wherein a test strip is elongated (pulled) by the jaws at a constant rate and the tensile force is constantly measured, so that a graphic record can be obtained of tensile force (stress) versus elongation (strain) up to the moment of breaking. Film strips of one inch width and approximately 3–4 mils thickness are tested. The percent per minute rate of strain refers to the percent of elongation of the test strip (between the jaws) per minute.

The present polypropylene film can be given an adhesion-promoting electrical discharge surface treatment, on one or both sides, which does not adversely affect the body of the film. Such surface treatment will permit of stronger anchorage of applied coatings, such as a low-adhesion backsize that is adapted to reduce the force required for unwinding a roll of pressure-sensitive tape, and a primer facesize that is adapted to increase the anchorage of the subsequently applied overlying tacky adhesive coating. Such backsizes are described in U.S. Patents Nos. 2,532,011 (Nov. 28, 1950), and 2,607,711 (Aug. 19, 1952). An example of a primer is a mixture of atactic (amorphous) polypropylene and butyl rubber in 1:4 ratio by weight. These size coatings are applied as a solution of the sizing in a volatile solvent, followed by drying, to form a thin dried size coating.

Use can be made of adhesion-promoting electrical discharge (corona) treatments such as are already known for use in treating polyethylene and polypropylene film surfaces. See, for instance, U.S. Patent No. 3,118,534 (Jan. 21, 1964), which relates to fibrous pressure-sensitive adhesive electrical tape having a laminated backing formed of a thin polypropylene film fused to a paper.

Pressure-sensitive adhesive tapes of this invention are not limited to masking tapes. These novel "paper-like" but nonfibrous film-backed adhesive tapes can be sold and used for other purposes for which suited. For instance, excellent label and identification tapes can be made, having "write on" back surfaces that can be legibly written on with pencil or pen. For such other usages, the specific combination of properties best suited thereto can be selected and may differ appreciably from the preferred properties incorporated in a tape product designed primarily for masking tape usage.

For example, as illustrated hereafter in Example 2 the invention can be employed in the manufacture of "paper-like" adhesive tapes having a printable backsize coating, which can be printed on the back by means of flexible "flexographic" printing plates and flexographic inks.

Rolls of such tape can be used in place of paper tape in machines which automatically apply severed pieces of tape to the lids of household scouring powder cans to cover the prepunched holes therein. The housewife opens the can by peeling off the piece of adhesive tape and can repeatedly reapply the tape on account of its normally tacky nature. This tape can carry printed directions or a message.

Example 1

This description relates to a presently preferred masking tape made in accordance with our invention, utilizing an unoriented unplasticized extruded "paper-like" pigmented opacified isotactic polypropylene backing film. All parts are by weight.

Use is made of "Pro-fax" brand of isotactic polypropylene resins sold by Hercules Powder Company but equivalent polypropylene resins are available from other sources and can be employed. These "Pro-fax" resins have a nominal density of 0.905 and a melting point of approximately 170° C. and are best distinguished on the basic of the melt flow (melt index) values to which reference has previously been made.

A pigmented masterbatch is prepared by mixing together in a Banbury mixer, 900 parts of pelletized "Pro-fax 6423" resin (melt flow of 6.5), 360 parts of titanium dioxide pigment, 27 parts of brown iron oxide pigment (e.g., "Mapico Brown 418" sold by Columbian Carbon Co.) and 171 parts of yellow strontium chromate pigment (e.g., "Imperial X–2396" sold by Hercules Powder Co.). This mix is cooled and then chopped into small granules or pellets in a pelletizer.

The extrusion composition is made by mixing together 17.8 parts of the aforesaid masterbatch pellets and 100 parts of "Pro-fax 6523" pellets (melt flow of 4.0). This mixture provides a film product comprised of 94.23% polypropylene and 5.77% pigments. The combination of pigments results in an opacified but somewhat translucent film having a tan color resembling that of typical creped paper masking tape backings.

An NRM extruder (sold by National Rubber Machinery Co., Akron, Ohio), having a barrel diameter of 2½ inches and a length to diameter ratio of 16:1, equipped with a V-shaped, 26 inch wide, slot die, employing a constant-pitch rapid-metering screw with a 3.8:1 compression ratio operated at 25 r.p.m., is used. A 20 mil die orifice is used to yield film of 3.3 mils thickness. The barrel temperature ranges from 400° at the hopper end to 550° F. at the discharge end, and the die is operated at 550° F., so that the exudate film has a temperature of about 450° F. This film is extruded vertically downward into the nip of a pair of water-cooled rolls, the nip being about 1½ inches below the die orifice. One of the rolls is a steel roll having a polished chromium plated surface adapted to impart a glossy finish to one side of the film (ultimately being the back side in the tape produce). The other roll is a steel roll covered by a soft resilient sleeve of silicone rubber having a thickness of about ¾ inch. These rolls have a diameter of approximately 8 inches. The rolls are set to exert a slight pressure on the film passing therethrough, which passes around the chromium-plated roll for a quarter turn and is then drawn horizontally through the nip of pull rolls and thence to a wind-up stand where the film is wound up upon itself in a jumbo roll. The extruded film sheet is kept taut and is produced at the rate of 15 lineal feet per minute. Contact with the slightly compressed silicone rubber surface in passing through the nip, produces a dull finish on that side of the film, which is the adhesive-coated face side in the tape product.

The surface of the chromium-plated roll is maintained at a temperature of 190° F. (by control of the circulating cooling water) and reduces the temperature of the contacting extruded film to about this figure. The rubber-covered roll has a higher surface temperature. This results in quenching of the film, but the quenching is not of the magnitude employed in the rapid quenching of the previously mentioned tough films intended for packaging usages.

Sample strips of this film product have been measured on an Instron tensile tester in the manner previously indicated. The elongation at break was 528% and the tensile strength was 15.8 pounds per inch width (4800 pounds per square inch of cross-section) when determined at a strain rate of 500% per minute. The elongation at break was 16% when the strain rate was 5000% per minute. This film has a thickness of 3.3 mils.

The film is subsequently given an adhesion-promoting electrical corona treatment on each side which does not measurably affect the tensile values given above. This is readily accomplished by drawing the film at 15 feet per minute around a rotatable 16-inch steel drum which is electrically connected to ground. Concentrically located ½ inch from the surface of the drum is a semi-cylindrical steel shroud to which is applied an alternating current potential of about 8000 volts at 300 cycles per second, so as to cause a continuous electrical discharge between the shroud and the drum which imparts the desired treatment to the exposed surface of the film. Subsequently the reverse side of the film is similarly treated.

This film sheeting is then given a low-adhesion backsizing by coating the glossy side (which has contacted the chromium-plated roll) with a 5% solution in toluene of the copolymer reaction product of N-octadecyl isocyanate and polyvinyl alcohol, followed by drying. (See U.S. Patent No. 2,532,011.)

The film is then primed on the face side (which has a dull finish) with a solution in 786 parts toluene of 100 parts "neoprene W" chlorobutadiene rubber sold by Du Pont, 70 parts of oil-soluble heat-advancing phenol-aldehyde resin, 4 parts magnesium oxide, 5 parts zinc oxide and 1.5 parts sodium acetate, which are combined in a heavy duty mixer.

After drying, the primed face side of the film is coated with the rubber-resin pressure-sensitive adhesive containing a reactive phenol-aldehyde resin of the oil-soluble heat-advancing type which acts as a "vulcanizing" or cross-linking agent to firm up the rubber on heating, as is well known in the art, thereby making the masking tape product suitable for high-temperature applications. The adhesive coating composition consists of 520 parts natural rubber (smoked sheets), 104 parts titanium dioxide pigment, 52 parts zinc oxide pigment, 180 parts polyterpene tackifier resin having a melting point of 115° C. (e.g., Piccolyte S–115, sold by Pennsylvania Industrial Chemical Co.), 26 parts tricresyl phosphate, 10.4 parts rubber antioxidant (e.g., 2,5-di-tertiary amyl hydroquinone), and 32 parts oil-soluble heat-advancing phenol-aldehyde resin (e.g., CKR–1634 resin sold by Union Carbide Corp.) which are mixed together in a heavy duty mixer and dispersed in a volatile solvent vehicle consisting of 104 parts ethyl alcohol, 104 parts toluene and 1912 parts heptane.. The coating weight is adjusted to provide, after drying, a dried adhesive coating which weighs approximately 5 grains per 24 square inches of film (corresponding to 37 lbs. per thousand square yards).

The resulting adhesive-coated sheeting is slit and wound into tape rolls of desired width. This tape is useful as a masking tape having the desired properties previously indicated.

Example 2

This example illustrates a white printable adhesive tape useful for sealing prepunched lids of scouring powder cans, and which is prodced by the procedures of Example 1 except as follows:

The pigment content of the polypropylene film consists exclusively of titanium dioxide pigment, in a proportion of 20%, thereby providing a fully opacified brilliant white film.

After electrical treatment on both sides, each side is printed in the manner described for printing one side in the preceding example (the low-adhesion backsizing being omitted).

The primed back side of the film is then provided with a printable backsize by being coated with a 20% solution in toluene of a 1:1 copolymer of ethyl acrylate and methyl methacrylate, followed by drying.

The primed face side of the film is given a coating of a transparent pressure-sensitive adhesive compounded of 100 parts pale crepe natural rubber, 40 parts polyterpene tackifier resin of 115° C. melting point 10 parts zinc resinate, 5 parts tricresyl phosphate, 1 part rubber antioxidant, 6 parts oil soluble heat-advancing phenol-aldehyde resin, mixed together in a heavy duty mixer, and dissolved in a solvent mixer of 20 parts ethyl alcohol, 20 parts toluene and 350 parts heptane.

The dried sheeting is then slit and wound into rolls of desired size.

Although this tape is intended primarily for uses other than as a masking tape for painting, it is a "paper-like" nonfibrous film-backed tape having the unique characteristics provided by this invention and can be used as a masking tape.

The pigmented backing film of this tape has been tested and found to have an elongation at break of 500% and a tensile strength of 18 pounds per inch width at a strain rate of 500% per minute, and an elongation at break of 15% at a strain rate of 5000% per minute.

Example 3

A pigment masterbatch is prepared from 900 parts of "Pro-fax" polypropylene resin (melt flow of 0.8), 360 parts titanium dioxide pigment, 81 parts brown iron oxide pigment, and 45 parts of organic yellow pigment (e.g., "Iroquois Yellow X1285," sold by Hercules Powder Co.).

The extrusion composition is prepared by mixing 7 parts of the masterbatch pellets with 95 parts of "Pro-fax 6423" polypropylene resin (melt flow of 6.5) pellets; so that the film product will have a total pigment concentration of 2.4% and a brown color.

In this case use is made of a Prodex extruder (Prodex Corp., Fords, N.J.) having a barrel diameter of 1¾ inches with a length to diameter ratio of 24:1, equipped with a V-shaped, 14 inch wide, slot die, and a constant-pitch, metering type screw with 5:1 compression ratio operated at 30 r.p.m. The barrel die temperatures are maintained in the range of 400° F. at the hopper end to 500° F. at the discharge end, and the die at 500° F. The die orifice is selected to yield a film having a thickness of 3 mils which passes in a taut condition to the windup at a speed of 9 lineal feet per minute. The extruded film drops into the nip of a pair of rolls and is quenched by the chromium plate steel roll as described in Example 1.

In experiments with the foregoing composition and procedure conditions, it was found that suitable films were made when the surface of the chromium plated steel roll was maintained in the temperature range of about 125° to 170° F.

A roll temperature of 125° F. yielded film having an elongation at break 845% and a tensile strength of 19 pounds per inch width at a strain rate of 500% per minute; and an elongation at break of 10% at a strain rate of 5000% per minute.

A roll temperature of 170° F. yielded film having an elongation at break of 865% and a tensile strength of 20 pounds per inch width at a strain rate of 500% per minute; and an elongation at break of approximately 10% at a strain rate of 5000% per minute.

In contrast, in an experiment where the roll temperature was maintained at 60° F., an excessively ductile and tough, non-tearable, film was produced which had an elongation at break of 500% at a strain rate of 5000% per minute. At the other extreme, when the roll temperature was maintained at 200° F., an excessively brittle film was obtained which had an elongation at break of only 10% even when slowly pulled at a certain rate of 500% per minute.

Using either of the suitable films mentioned above (roll temperature of either 125° or 170° F.), a satisfactory masking tape can be made by following the procedures and compositions described in Example 1 for electrical treatment, backsizing, priming and coating with pressure-sensitive adhesive.

Example 4

This example illustrates the use of isotactic polypropylene resins from another source than the one previously mentioned.

Use was made of "Tenite" polypropylene resins sold by Eastman Chemical Products, Inc. A pellet mixture was made of equal parts of "Tenite" color concentrate (masterbatch) identified as "4230A–2005–53B" (which contains 38% titanium dioxide pigment and 62% isotactic polypropylene resin), and "Tenite 4231" (melt flow value of 4.5) which is uncompounded isotactic polypropylene resin.

Film was made in a thickness of 3 mils by the extrusion procedure described in Example 3, the quenching roll temperature being 170° F. This film was completely opaque due to the high pigment loading (19%). It had good handling and tear characteristics for masking tape usage. At all strain rates in the 500 to 2000% per minute range, the elongation at break exceeded 400% and the tensile strength at break was 14 or more pounds per inch width. At a strain rate of 5000% per minute, the elongation at break was 20%.

In this experiment, the film was not electrically treated nor was any backsizing applied. The dull-finish face side was primed with a 15% solution in toluene solvent of a 1:4 blend of atactic (morphous) polypropylene and butyl rubber, and dried. The primed surface was then coated with the pressure-sensitive adhesive composition described above in Example 2.

The dried adhesive sheeting was then slit and wound into tape rolls. This tape was found to be a statisfactory masking tape.

Example 5

The example illustrates the use of a mixture of polypropylene resins of low and high melt flow values.

The following formulation was blended in a Banbury mixer, transferred to a rubber mill, cut off in long narrow strips and fed into a mechanical grinder to provide granules: 100 parts "Pro-fax 6723" resin (melt flow of 0.8), 20 parts "Tenite 4251" resin (melt flow of 18), 10 parts "Hi-Sil 233" brand colloidal amorphous silica (sold by Pittsburgh Plate Glass Co.), 10 parts "HT–1068" butyl rubber (sold by Enjay Chemical Co.), 1.2 parts calcium stearate, 0.48 part antioxidant (e.g., "Santonox R" sold by Monsanto Chemical Co.), 0.12 part brown iron oxide pigment, 0.76 part yellow strontium chromate pigment, and 4.8 parts titanium dioxide pigment.

The granules were melted and extruded in the manner described above in Example 3 except that film of 4 mils thickness was produced, the barrel and die temperatures being 500° F. Satisfactory films were produced at both 120° F. and 170° F. quench temperatures (chromium-plated roll temperatures).

These films were primed and coated with adhesive as described above in Example 4 (using the adhesive of Example 2), to produce satisfactory masking tapes in accordance with this invention.

We claim:

1. A nonfibrous finger-tearable stretchable pressure-sensitive adhesive tape having an unplasticized unoriented polypropylene film backing coated with an aggressively-tacky pressure-sensitive adhesive, wherein said film backing has a thickness of approximately 3 to 4 mils and consists essentially of pigmented isotactic polypropylene which has a melt flow value in the range of 1 to 10, containing approximately 2 to 20% total dispersed pigment which opacifies the film and substantially modifies physical properties, said film having been compounded and melt-formed in such manner that it is readily finger-tearable, has an elongation at break of over 100% and a tensile strength of at least 10 pounds per inch width at a 500% per minutes strain rate, and an elongation at break in the range of 10 to 50% at a 5000% per minute strain rate.

2. An adhesive masking tape according to claim 1, wound upon itself in roll form, wherein the backing film is pigmented so as to have a tan color appearance resembling that of kraft paper.

3. An adhesive tape according to claim 1, wound upon itself in roll form, wherein the film is heavily loaded with titanium dioxide pigment so as to be fully opacified and have an intense white color, and has a printable backsize coating.

References Cited

UNITED STATES PATENTS

| | | | |
|---|---|---|---|
| 2,971,858 | 2/1961 | Di Gfulio et al. | 117—138.8 X |
| 2,998,324 | 8/1961 | Hirt | 117—138.8 X |
| 3,079,278 | 2/1963 | Naudain | 117—138.8 X |
| 3,110,611 | 11/1963 | Powelson | 117—138.8 X |
| 3,222,210 | 12/1965 | Hammond | 117—138.8 X |
| 3,224,896 | 12/1965 | Quinn et al. | 117—138.8 X |
| 3,241,662 | 3/1966 | Robinson et al. | 117—122 X |

WILLIAM D. MARTIN, *Primary Examiner.*

W. D. HERRICK, *Assistant Examiner.*

UNITED STATES PATENT OFFICE
CERTIFICATE OF CORRECTION

Patent No. 3,396,837　　　　　　　　　　　　　　　　　August 13, 1968

Ambrose F. Schmelzle et al.

It is certified that error appears in the above identified patent and that said Letters Patent are hereby corrected as shown below:

Column 1, line 71, after "fact" insert -- that --. Column 2, line 57, "toughnesses" should read -- toughness --. Column 5, line 15, "basic" should read -- basis --; line 50, "produce" should read -- product --. Column 6, line 26, "786" should read -- 768 --; line 62, "prodced" should read -- produced --; line 69, "printed" should read -- primed --; same line 69, "printing" should read -- priming --. Column 7, line 70, "certain" should read -- strain --. Column 8, line 29, "(morphous)" should read -- (amorphous) --; line 34, "statisfactory" should read -- satisfactory --. Column 9, line 2, "minutes" should read -- minute --.

(SEAL)　　　　　　　　　Signed and sealed this 3rd day of March 1970.

Attest:

Edward M. Fletcher, Jr.　　　　　　　　　　　WILLIAM E. SCHUYLER, JR.
Attesting Officer　　　　　　　　　　　　　　　　Commissioner of Patents